Feb. 13, 1940.  M. BRETSCHNEIDER  2,190,529
APPARATUS FOR PRODUCING A UNIFORM TENSION IN WINDING DEVICES
Filed Oct. 4, 1935  6 Sheets-Sheet 2
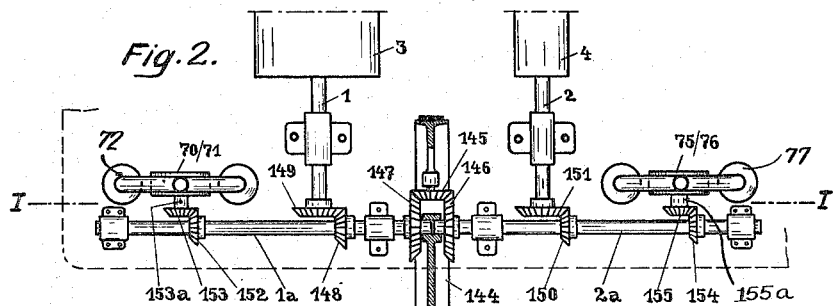
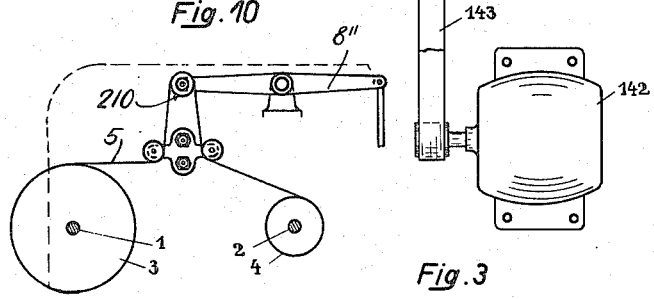
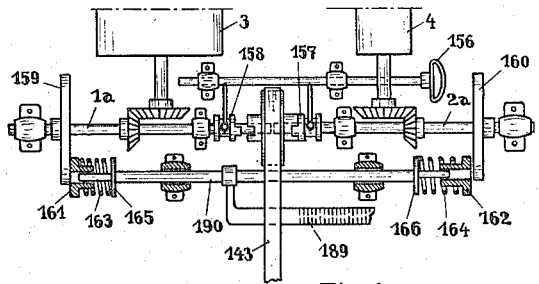
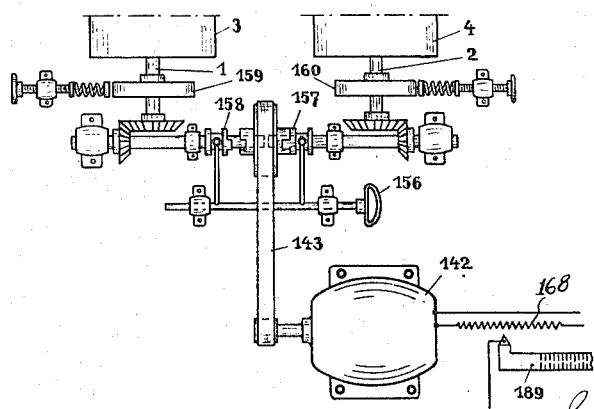

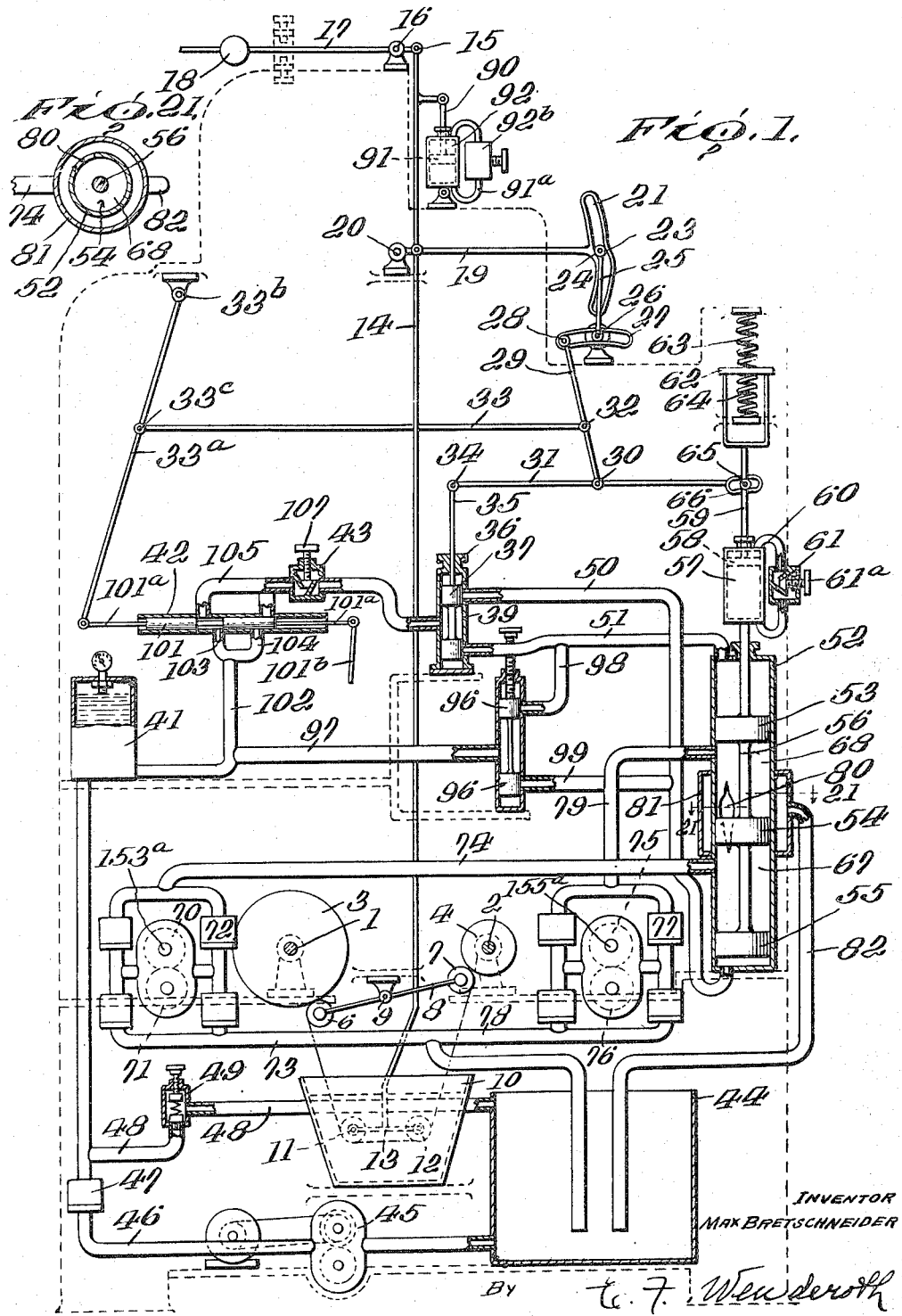

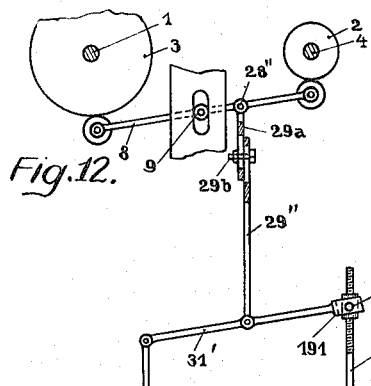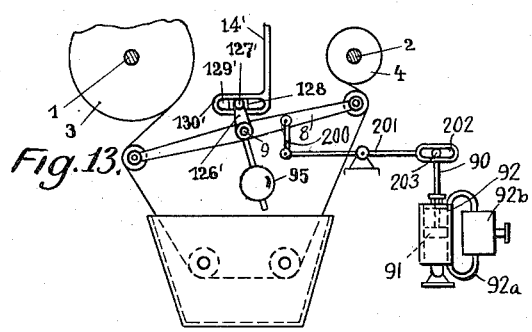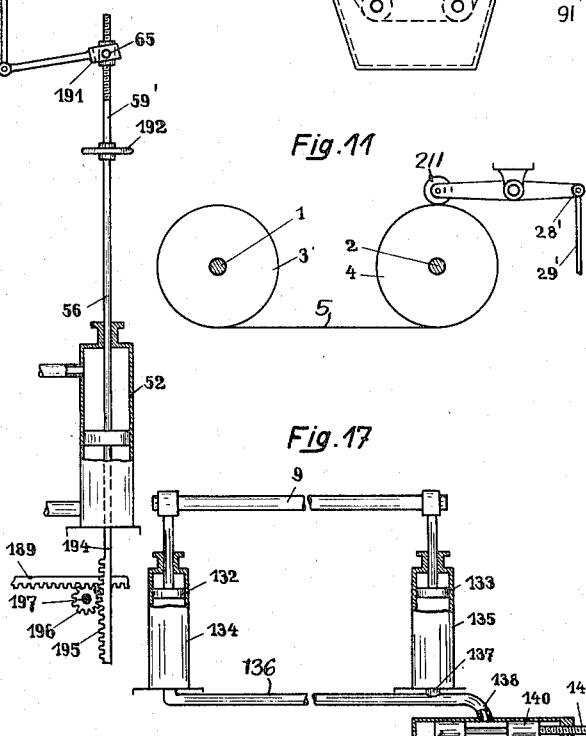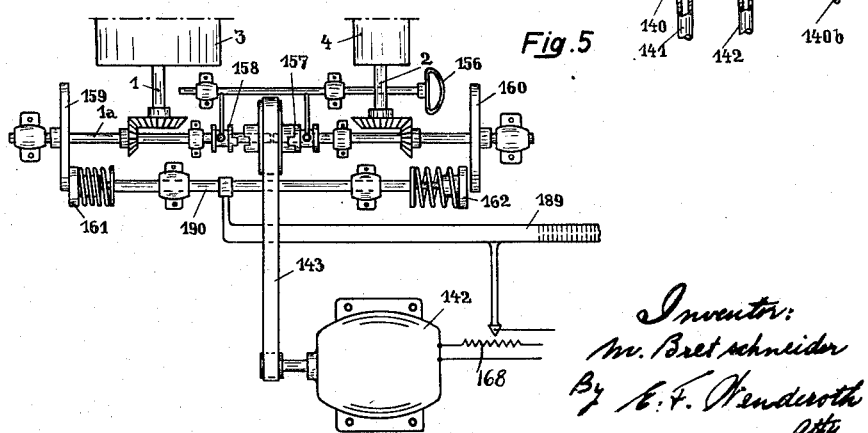

Feb. 13, 1940.　　　M. BRETSCHNEIDER　　　2,190,529
APPARATUS FOR PRODUCING A UNIFORM TENSION IN WINDING DEVICES
Filed Oct. 4, 1935　　6 Sheets-Sheet 4

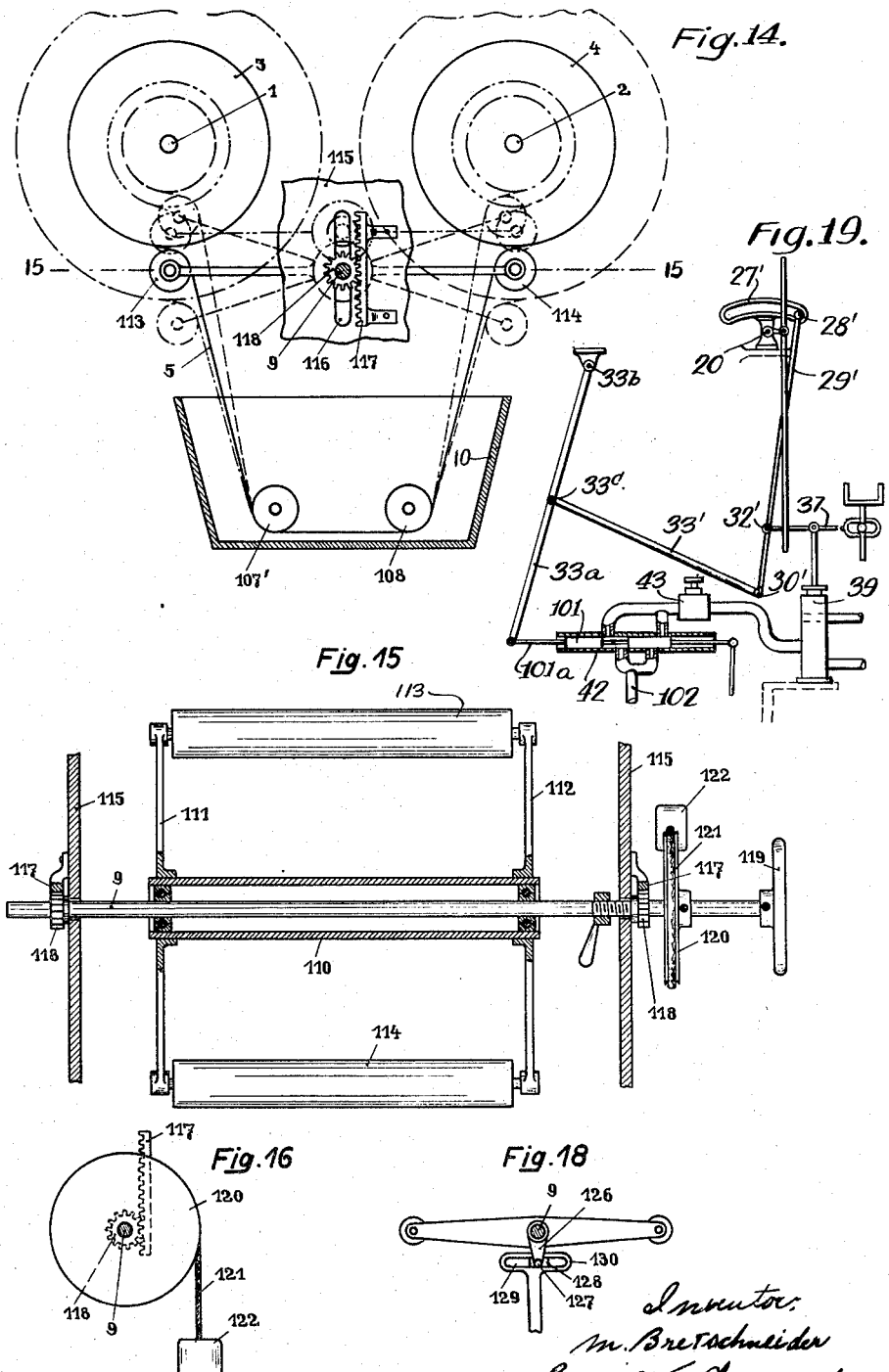

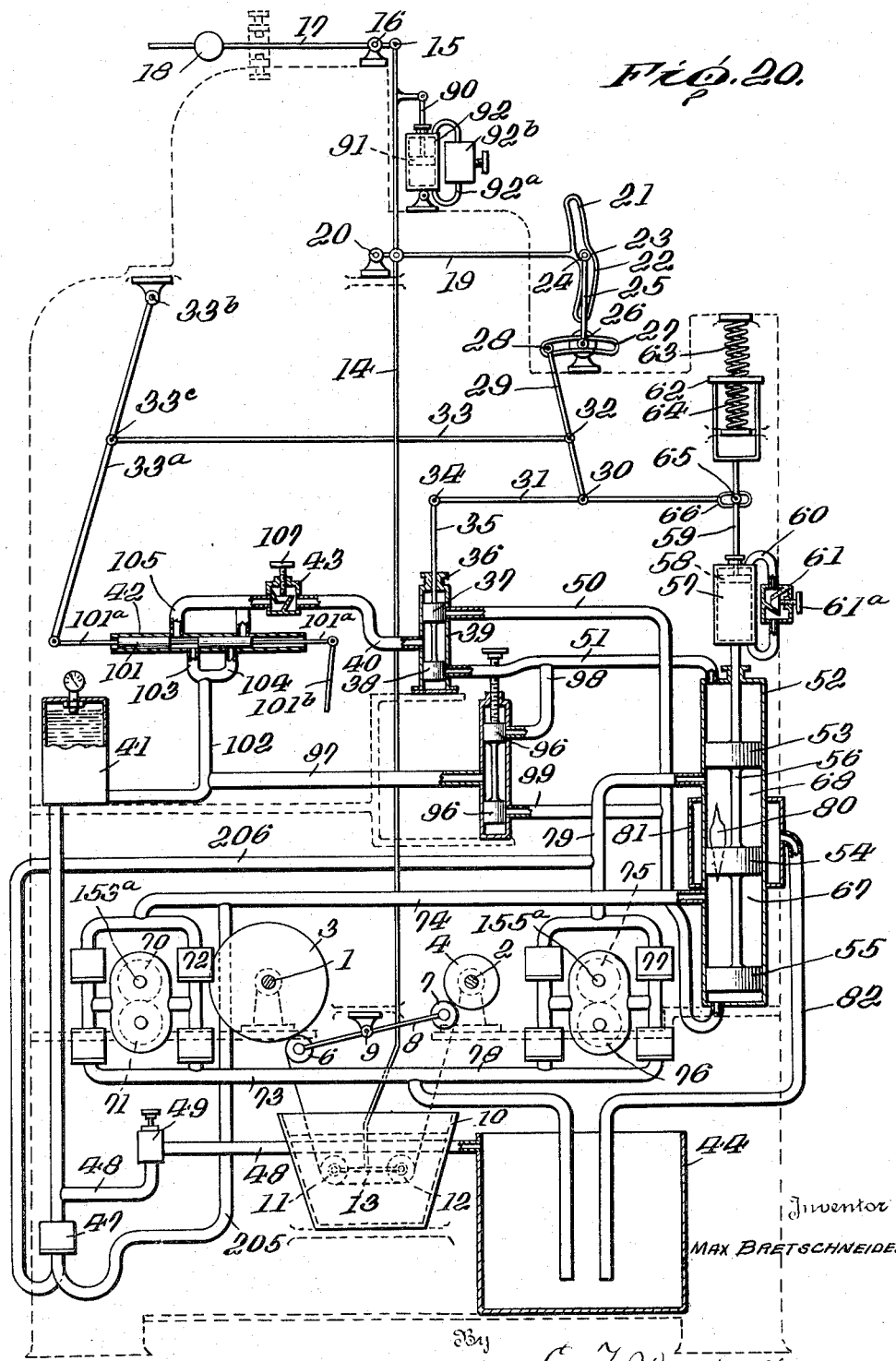

Patented Feb. 13, 1940

2,190,529

UNITED STATES PATENT OFFICE 2,190,529

APPARATUS FOR PRODUCING A UNIFORM TENSION IN WINDING DEVICES

Max Bretschneider, Plauen, Germany

Application October 4, 1935, Serial No. 43,593
In Germany October 11, 1934

21 Claims. (Cl. 242—55)

This invention relates to a device for producing a uniform tension in the material in winding devices, particularly in jigger dyeing machines.

For this purpose the speed of rotation of the delivering or winding rollers is so controlled that they can be varied both absolutely and also in relation to one another. The control of the speed of the rollers can be effected through the medium of brake gearing, through brake gearing and a motor, through a number of driving motors or through a separate control motor provided in addition to the driving motor.

The object of the invention is to guide the material on the winding roller and on the winding off roller at approximately the same speed. This object is not simple to attain because the diameters of the beams vary with each rotation. The speed of travel of the material is thus dependent on the diameter. For every diameter there is a definite speed of the material. The speed of travel of the material can thus be regulated by testing the diameter at any moment and regulating the speed of rotation of the rollers to correspond to this diameter. In addition to feelers which test the diameter, feelers are also provided which directly test the tension. A definite tension corresponds to a definite position of the feelers. If, for example, the tension is too great the feeler is raised, if it is too small the feeler is lowered. Thus, in this instance also, the feeler makes a movement. In both instances, i. e. in testing the diameter and in direct testing of the tension, the movement of the feelers is transmitted by a gearing and thereby controls a servo-motor with the aid of which the required alteration in the number of revolutions of the rollers is initiated. The servo-motor is connected with a restoring means which prevents too great regulation so that undue movement of the regulating device is prevented.

Alterations in the number of revolutions which must be controlled by the servo-motor are (1) an increase or reduction in the number of revolutions of the winding off roller, (2) an increase or reduction in the number of revolutions of the winding roller, and (3) an increase in the number of the revolutions of the one and a simultaneous reduction of the number of revolutions of the other roller and vice versa. The alteration of the number of revolutions of the rollers can be effected by a suitable means. Such means are not claimed but only the control of this known means by feelers which contact with the material or with the roller diameter and through the medium of servo-motors with restoring means effect this control.

Figure 1 is an elevational view with portions shown in section of an entire installation taken on the section line I—I of Figure 2.

Figure 2 is a plan view of Figure 1 with portions omitted for greater clarity particularly illustrating the driving mechanism.

Figure 3 is a plan view with parts in section similar to Figure 2 and illustrating a modified drive.

Figure 4 is a plan view of another drive modification.

Figure 5 is a still further modification of a drive mechanism and comprises a combination of the driving mechanisms shown in Figures 3 and 4.

Figure 10 shows an elevational view of a modified arrangement of the winding rollers of a simple winding device in which the material is maintained by a guide roller at a desired tension.

Figure 11 is a further modification showing in elevation the arrangement of the winding rollers and the feelers of a simple winding device.

Figure 12 is an elevational view with portions in section illustrating a further modification in which rigid means are used for restoring the control mechanism to equilibrium.

Figure 13 is an elevational view of a modification in which the oscillating tensioning device is arranged as a filler.

Figure 14 is an elevational view with portions in section of a further modification in which the supporting shaft of the oscillating tensioning device is adjustable vertically.

Figure 15 is a horizontal sectional view of Figure 14 taken on the section line 15—15 of Figure 14.

Figure 16 is an elevational view of a detailed used with the modification shown in Figures 14 and 15.

Figure 17 is an elevational view with portions in section illustrating a modified construction for causing a vertical displacement of the shaft of the oscillating tensioning device.

Figure 18 is a partial elevational view of a further modified construction for transmitting the movement of the oscillating tensioning device.

Figure 19 is an elevational view with portions in section illustrating a modified construction.

Figure 20 is an elevational view with portions in section illustrating a further modified construction.

Figure 21 is a cross sectional view taken on the section line 21—21 of Figure 1.

Figure 6:
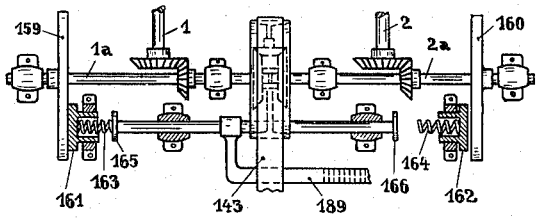
Figure 6 is a plan view of a still further modification of a driving mechanism.

The embodiment of the invention shown in Figures 1 and 2 is applied to a jigger dyeing machine in which the driving motor acts on the freely movable part of the differential or like gearing connecting the two rollers. In this modification as will appear more fully hereinafter the control of the roller speed is effected through the medium of hydraulic brakes.

On the shafts 1 and 2, (Fig. 1) are supported rollers 3 and 4 for the material of which the one is at any time the winding-off roller and the other the winding roller in order to lead the material 5 through the dye bath. Adjacent the material roller 3 is a guide roller 6 and adjacent the material roller 4 is a guide roller 7. The two guide rollers 6, 7 are carried by a lever system 8 which is rotatably mounted by means of the shaft 9 on the machine frame. The parts 6—9 form the oscillating tensioning device. Within the vessel 10 in which the dye is disposed are arranged the rollers 11 and 12. They are rotatably mounted on cross members 13 which are firmly connected with the supporting rod 14, the upper end 15 of which is pivoted on a double-armed lever 17 mounted at 16 on the machine frame. The free arm of the latter carries a regulating weight 18 by which the weight of the rollers 11 and 12 as also of the supporting system 13, 14 is partly balanced. The unbalanced remainder of the latter load determines the tension at which the material 5 is moved through the dye bath.

In order to prevent undue vibration of the supporting rod 14 the piston rod 90 is pivoted to one side arm thereof. The piston rod carries a piston 91 which is guided in a cylinder 92 secured to the machine frame and with the latter forms an oil brake or dash pot. It carries a transfer pipe 92a in which is located a regulating valve 92b. The latter operates on the same principle as the regulating valve 61 which will later be more fully described.

The support 14 is moreover connected to a lever 19 which at 20—the axes 20 and 9 may coincide—is rotatably mounted in the machine frame and carries at its free end a cam guide. The upper part 21 of the latter and its lower part 22 form portions of an arc about the pivot 20, while at the centre a transfer cam member 23 is provided. Into the cam guide 21, 23 extends a pin 24 which is secured at the upper end of a lever 25. This lever is mounted at 26 in the machine frame. Adjacent the bearing is movably attached thereto a slide 27. In the latter is guided a pin 28 of a lever 29, the other end of which lever is pivoted at 30 to a controlling lever 31. At the point 32 of the lever 29 is connected a connecting rod 33 which is actuated by reversing gear by which the drive of the rollers 1, 2 can be reversed each time the material 5 has passed through the dye in the vessel 10.

The controlling lever 31 is pivoted at one end 34 to the piston rod 35 which is guided vertically in a straight line at 36 on the machine frame and carries at its lower end two auxiliary control pistions 37 and 38. The latter are guided in the auxiliary control cylinder 39 into the centre of which the connecting pipe 40 from a pressure liquid supply 41 leads. In the connection 40 is provided a shut-off device 42 and a regulating device 43. The regulating device 43 is suitably adjusted by hand. By rotating the disc 107 the distance of the conical valve from its seat is varied. Moreover, the cross sectional flow is also varied and therewith the quantity of fluid passing through is regulated. The shut-off device 42 consists of the double piston 101. This is displaced to the right or left by the connecting rod 101a. To the connecting rod 101a is connected a rod 101b actuated by the reversing device of the jigger. The connecting rod 101b displaces the rod 101a to the right or to the left. Thus, the rod 33a is also turned about its pivot 33b and in its movement displaces the rod 33 which is pivoted at 33c in a corresponding direction to the right or to the left. The pressure fluid flows from the supply 44 through the medium of the feed pump 45 through the piping 46 and the non-return valve 47 to the vessel 41. In order that the presure in the receiver 41 shall not exceed a definite value a safety valve 49 is provided in a branch pipe 48. The pipe 48 leads back into the supply vessel 44.

From the auxiliary control cylinder 39 lead two pipes 50 and 51 respectively to the two ends of the main control cylinder 52. The pipes 50 and 51 are so connected to the auxiliary control cylinder 39 that they are held closed in the middle position of the pistons 37 and 38 but on the upward or downward movement of the piston rod 35 one or the other of the two pipes 50 or 51 is put in communication with the pipe 40, and then the fluid under pressure can flow into the corresponding end of the main control cylinder 52 while it escapes from the other cylinder end. In the cylinder 52 are movable control pistons 53, 54, 55 which are connected by the piston rod 56 with one another. The latter carries at its upper end the cylinder 57 of an oil brake. In this cylinder is arranged the piston 58 which carries the restoring bar 59. The cylinder 57 has moreover an oil transfer pipe 60 with a regulating valve 61. The valve has a conical seat. On rotation of the disc 61a it is moved more or less away from its conical seat and the cross section of the flow and thus the quantity regulated. The piston rod 56 and associated elements constitute a movable member.

To the upper end of the rod 59 is connected a correcting means by which that rod 59, after every displacement, is forced back into a definite position. For this purpose there is secured at the upper end of the piston rod 59 in known manner a plate 62 against which springs 63 and 64 bear directly at both sides. The free ends of the springs are supported on the machine frame. A pin 65 on the rod 59 engages in a slot 66 in the lever 31.

Operation of the control gearing described is as follows:

On a swinging movement of the lever 25 and of the slide 27 the lever 31 is turned through the medium of the connecting rod 29 first about the still stationary pin 65 and thereby the piston rod 35 is displaced with the pistons 37 and 38. If the pin 28 is held by the rod 33, as shown in the drawing, at the left hand end of the slide 27, the piston rod 35, on increase of the tension in the material, is raised and is lowered on reduction of the tension of the material. With the material travelling in the opposite direction and after swinging of the lever 29 to the right, the control movements of the piston rod 35, with the same alterations in tension of the material, are reversed. On each displacement of the piston rod 35, from its position of rest, oil under pressure flows in a corresponding manner from the vessel 41 through one of the two pipes 50 or 51 to the corresponding end of the cylinder 52, and the pistons 53—55 arranged in the latter are displaced. These pistons through the medium of the braking devices 57, 58 move the piston rod 59 therewith. The pin 65 is thereby displaced and consequently the lever 31 is displaced about the point 30, which may be considered as stationary, so that the piston rod 35 prevents further flow of fluid under pressure to the main control cylinder 52. The pistons 53—55 remain then in their position within the cylinder 52. Disturbance of the equilibrium of the forces exerted by the springs 63 and 64 on the rod 59 in the preceding displacement of the pistons 53—55 acts in such direction that the piston secured to the piston rod 59 is displaced within the cylinder 57 until the piston rod 59 again has assumed its original position in space. The speed with which the piston 58 is moved within the cylinder 57 under the influence of the springs 63, 64 is regulatable by the valve 61.

On the shaft 1 carrying the material roller 3 or on a shaft 153a driven by the driving shaft is mounted a pinion 70 which forms with the pinion 71 a wheel pump (see also Fig. 2) with which is associated a conduit system having four non-return valves 72 in order that, on each direction of rotation of the pump, liquid is drawn from the supply vessel 44 through the pipe 73 and forced through the pipe 74 into the space 67 of the working cylinder 52 between the two pistons 54 and 55.

In a similar manner, there is mounted on the supporting shaft 2 of the material roller 4 or on the shaft 155a driven by the main shaft, a pinion 75 which, with the pinion 76 forms a wheel pump and with the aid of the non-return valves 77 in each direction of rotation draws liquid from the supply vessel 44 through the pipe 78 and by means of pipe 79 forces it into the space 68 in the main control cylinder 52 between the pistons 53 and 54.

Adjacent the piston 54, the wall of the main control cylinder 52 is provided with a slotted port 80, which is of greater extent than the path of the piston 54 and is enlarged in the middle as shown in the drawing. Adjacent the port 80 there is connected to the cylinder 52, a casing 81 from which a pipe 82 leads to the supply vessel 44.

In consequence of the above-described shape of the port 80 only the lowermost end of this in the lowest position which the piston can assume, extends into that space 67 of the cylinder 52 which lies between the pistons 54 and 55, while the main portion of the port 80 lies within the space 68 between the pistons 53 and 54.

In consequence, the quantity of fluid supplied by the pump 70, 71 from the vessel 44 into the cylinder space 67, only has a narrow passage to the casing 81, so that the pump 70, 71 must bring the fluid to such a high pressure that it can flow with the requisite velocity through the narrow passage provided. This increase in pressure, however, requires a considerable consumption of energy of the wheel pump 70, 71 and consequently exerts a strong braking action on the drive of the material roller 3. In contradistinction thereto, the quantity of fluid supplied by the pump 75, 76 on its travel through the upper part of the port 80 meets hardly any resistance so that the pump 75, 76 runs freely and accordingly the driving force of the motor acts to the full extent on the material roller 4.

When in consequence of the braking action of the material roller 3 and the driving force acting on the material roller 4, the tension in the material increases too greatly, the guide rolls 11, 12 with the supporting frame 14 are moved upwardly and thereby displacement of the pistons 53—55 is effected in the above-described manner. The pistons alter their position, however, only comparatively slowly as is required by the control or throttling device 43, on the one hand, and the downward restoring device 59, 66 on the other. In consequence of the displacement of the piston 54, the passage openings for the fluid supplied by the pumps 70, 71 and 75, 76 are varied in such manner that in the first half of the winding operation the braking force acting on the material roller 3 becomes gradually smaller, while such a braking action due to the shape and size of the passage 80 does not become noticeable as regards the material roller 4, while in the second half of the winding operation the braking force acting on the material roller 4 continuously increases as the part of the opening 80 available for the displacement of the piston 54 for the quantity supplied by the pump 75, 76 is effectively reduced, while on the material roller 3 in this part of the winding operation, a braking action is exerted to hardly a noticeable extent. The requirements for satisfactory operation of a jigger dyeing machine are thus met.

The control device described has the essential advantage that its operates completely automatically and thus the tension of the material passing through the dye bath remains quite uniform during the winding operation.

In addition it is, however, very important that in the treatment of different kinds and different lengths of materials a modification of any of the devices should not be necessary in case the material is to pass with a different tension through the dye bath. In the latter case it is only necessary to adjust the weight 18 in a suitable manner. The apparatus operates with thin material as reliably as with thick material.

The slide 27, in lieu of being mounted in a separate stub axle, may be mounted on the free end of the shaft 20 so that then the cam guide 21, 23 on the lever 25 may be dispensed with. The construction shown in the drawing, (Fig. 1), has the advantage that particularly with small displacement of the supporting rod 14, the slide 27 is displaced through the whole angle and accordingly remains undisturbed with a still further movement of the lever 19.

In the construction shown in Figure 19 the modification briefly described immediately above is illustrated. The slide 27' is mounted on the free end of the shaft 20 and the cam guide 21, 23 coacting with the lever 25 is dispensed with. The rod 29' which is the equivalent of the rod 29 shown in Figure 1 directly cooperates with the slide 27' by means of the roller 28'. The rod 29' is connected to the rod 31 similar to the rod 31 of Figure 1 at 32' and is connected to the rod 33' which is the equivalent of the rod 33 in Figure 1 at 30'. The rod 33' is connected to the rod 33a at 33c and the remaining construction is the same as in Figure 1. Moreover the pump 45 may be dispensed with if connecting pipes lead from the pipes 74 and 79 or from one of these pipes to the container 41 through the medium of the non-return valve 47. In this instance the container 41 is filled at the beginning of each working movement.

In Figure 20 of the drawings the modification referred to above wherein the pump 45 is dispensed with is illustrated. As will be noted upon reference to this figure a connecting pipe 205 leads from the pipe 74 to the pipe 46 and a connecting pipe 206 leads from the pipe 79 to the pipe 46. The pipes 205 and 206 make their connections with the pipe 46 on the side of the non return valve 47 furthest from the container 41.

In lieu of obtaining the braking action hydraulically it may also be obtained mechanically or pneumatically.

The apparatus described may be varied in many ways. There may be used, as the feeler for actuating the control devices, an oscillating tensioning device or a separate feeler bearing on the material or on the material roller. Moreover, movably mounted guide rollers, bars, levers or the like may be employed as feelers. How they are disposed within the length of material extending between the delivering or winding roller and directly controlled by the tension of the material is immaterial. In Figs. 10—13 such movable guide rollers are shown as feelers.

The modification illustrated in Figure 10 shows an arrangement of the winding rollers in which the material 5 is maintained by the guide roller 210 at the desired tension. The guide roller 210 through the medium of the lever 8" effects the control of a servo-motor. With a filler mechanism of the type shown in this figure a resilient restoring means is necessary.

In Figure 11 there is shown a modification in which the guide roller 211 contacts and determines the diameter of a winding roller. This constitutes the feeler mechanism which will then transmit its movement to a mechanism which effects the control of a servo-motor such as shown in Figure 1. With a feeler mechanism of this type a rigid restoring means is necessary.

To distinguish from the feelers bearing on the material rollers, the feelers controlled directly by the tension of the material move about a position of equilibrium. With such feelers, completely uniform tension of the material during the winding operation can be obtained through suitable control means. With the feelers, which bear on the material rollers, only approximately uniform tension of the material can be obtained. Moreover, these feelers can be arranged as movably mounted rollers, oscillating tensioning devices, bars, levers or the like. Control of the feeler is effected by the material indirectly, due to the alteration in diameter of the material roller and such feelers do not swing about a position of equilibrium, but wander during the winding operation, slowly from one end position to the other.

If the oscillating tensioning device is arranged as a feeler which is controlled in the above described manner by the alteration in the diameter of the beams, it has been found advantageous, to arrange it in such a manner that the tensioning rollers, during the winding operation and the alteration in the diameter of the beams connected therewith, remain as near as possible to the latter. This condition cannot be entirely satisfied with known devices, in particular when different sizes of beams are to be inserted one after the other in the dyeing machine.

The oscillating tensioning device must be arranged differently from the previous construction so that the supporting shaft of the tensioning device is adjustable in height parallel to itself, (Figs. 14–17). In an oscillating tensioning device as shown in Figs. 14 and 15, the shafts 1 and 2 carry the beams 3 and 4 of which the one is wound off and the other wound on. On its path from one beam to the other the material 5 passes through the vessel 10 filled with dye in which the guide rollers 107', 108 are arranged. The oscillating tensioning device 113, 114, shown in Figs. 14 and 15, is arranged beneath both beams in such wise that it can be displaced in the vertical central plane between the two shafts 1 and 2. It rotates around the shaft 9. In order to facilitate easy rotation ball bearings are provided between the supporting shaft 9 and the hollow shaft 110.

On the latter are rigidly secured two double armed supporting levers 111, 112 which at their ends carry the hollow cylindrical tensioning rollers 113, 114. In order to hold the latter as near as possible to the two beams 3 and 4 the levers 111, 112 are arranged so that the axis of the rollers 113, 114 as well as that of the supporting shaft 9 lies as near as possible in the same plane. The tensioning operation is thereby facilitated.

In Fig. 12 is shown how with such a tensioning device, the lever 29" with its pin 28" engages the tensioning arm 8 without the need for the rod 33. Care must be taken that the lever 29" is adjustable as regards its length, analogously with the adjustment in height of the supporting axis of the tensioning device.

For this purpose, the rod 29" is arranged adjustable on the rod 29a and is clamped by the nut 29b in a suitable position. As with a rigid restoring means, the rod 59' cannot be conveniently adjusted, it must be possible to form the rod 59', which has mounted thereon the pivot 65 so that with like positions of the pistons 53—55, different positions of the point 65 may be provided. For this purpose it might be made removable. In the form shown the possibility of removal is replaced by providing the rod 59' with a screw thread. This screw thread engages in a corresponding thread in a sleeve 191 which is mounted on the lever 31' in a fork. By rotation of the hand wheel 192 the distance of the point 65 from the servo-motor piston can be varied according to the direction of rotation.

From Fig. 12 it is also clear how the piston projects from the servo-motor. Transmission of the movement of this free piston to the brake could be so arranged, for example, that the piston rod 194 carries a rack 195 which cooperates with a pinion 196. By the vertical movements of the piston rod or of the rack, the pinion 196, rotatable about a fixed axis 197, is set in corresponding rotation. It transmits its rotation to the rack bar 189. From Fig. 5 it is clear how this rack bar 189 engages on the brake rod 190 which is movable to the right and to the left and transmits its movement to this brake rod.

If the oscillating tensioning device is arranged as a feeler which swings about a position of equilibrium, care should be taken that its guide rollers do not bear on the winding rollers. In this case there must be a sufficient free space between the guide rollers of the tensioning device and the winding rollers (Fig. 13) in order that the tensioning device can move in the position of equilibrium. The suspension of the oscillating tensioning device is preferably arranged in stable equilibrium so that it returns of its own accord into its middle position. This position of equilibrium is obtained by a weighted arm 95 extending downwardly or by arranging the tensioning arm at an obtuse angle in the apex of which the suspension is located. Such suspension will appear similar to the form shown in Fig. 18.

It permits the swinging movements of the tensioning shaft 9 to be transmitted to the regulator. There is therefore secured to the same a downwardly directed arm 126 on the free end of which is mounted a pin 127 which engages in a block 128 sliding in a slide 129 of the cross head 130. The movements of the cross head 130 can be transmitted indirectly or directly to the restoring means. In Fig. 13 the downwardly extending arm 126 of Fig. 18 is turned upwardly as shown at 126'. The pin 127', block 128', and slide 129' of the cross head 130' are thus always displaced upwardly. This arrangement has the advantage that, as shown in Fig. 13, the rod 14' corresponding to rod 14 in Fig. 1 can be directly raised and lowered by the cross head 130'.

In such an arrangement the oil brake 90—92 of the form shown in Fig. 1 must be suitably secured to the tensioning device as shown in Fig. 13. This comprises the connecting link 200 and pivoted lever 201 having the slot 202 therein. A roller 203 mounted on rod 90 is located in slot 202.

Moreover, the oil brake can also be dispensed with when the damping, which the section of material lying between the guide rollers 11 and 12 in the dye bath receives, is sufficient.

In order to facilitate the displacement of the supporting shaft of the oscillating tensioning device parallel to itself in height there may be employed the arrangements shown in Figs. 14–17. In the front and rear machine frame walls 115 there are provided vertical slots 116 (Fig. 14). Secured parallel to the latter on the machine frame walls 115 are rack bars 117 in which mesh pinions 118 which are secured to the supporting shaft 9, so that on one rotation of the supporting shaft 9, which can easily be effected by means of a hand wheel 119 arranged at one end of the supporting shaft 9, such shaft 9 is raised and lowered being guided by the slots 116 and the two pinions rolling on the rack bars 117. By using the two rack and pinion drives 117 and 118, the supporting shaft 9 is always displaced parallel to itself on a change of its height. It therefore remains, also, parallel to the axes of the beams 3 and 4.

In order to maintain the supporting shaft 9 in equilibrium in spite of its unilateral support on the rack bars 117, it is recommended that a grooved pulley 120 be secured to the shaft 9 at a suitable point and that a cable 121 extend thereover, Fig. 16. This cable is secured at one end to the grooved pulley 120 while the other end of the cable 121 depends freely from the pulley 120 and carries a balance weight 122. The weight is arranged on the same side of the shaft 9 as the rack bars 117. In lieu of the weight there can be used gas or liquid pressure cylinders by which the tension is indirectly or directly balanced. Fig. 17 shows such liquid pressure cylinders. 9 is the shaft of the oscillating tensioning device. 132, 133 are pistons which project from the liquid cylinders 134, 135 and with their projecting ends engage the shaft 9 of the oscillating tensioning device. The pressure cylinders 134, 135 are connected by the pipes 136, 137, 138 with the supply pipe 142 for the oil under pressure and the outlet pipe 141 for such oil. The shaft 9 is raised or lowered by means of the double piston 140 which according to its position connects the pipes 141, 138 or 142, 138. Liquid under pressure can enter through pipe 142 and the pressure liquid may flow away through the pipe 141. The piston 140 can be displaced to the right or to the left by providing the piston rod 140a with threads coacting with a screw-threaded aperture so that on rotation of the handle 140b the desired right or left hand movement of the double piston 140 takes place. When liquid under pressure is supplied, the pistons 132, 133 and therewith the shaft 9 are raised. If the shaft is to be lowered the double piston 140 is so adjusted that the liquid can flow through the pipes 138, 141 to the reserve container 44 shown in Fig. 1. The adjusting forces which are imparted by such an oscillating tensioning device formed as a feeler are small like those of the other feelers. They are therefore increased by mechanical, hydraulic, pneumatic, or electric control means. In the arrangement described a hydraulic servo-motor is provided.

It is of particular importance that the control means should be provided with a restoring means. The restoring means itself may be mechanically or hydraulically actuated.

With feelers which are directly controlled by the tension of the material the restoring means must be resilient. This is shown in Fig. 1. With feelers controlled by the alteration in the diameter of the rollers the restoring means must be rigid. This is shown in the construction of Fig. 12.

With a resilient restoring means 30, 31, 34—39, 56—61, 65, 66 a directing force 62—64 and a mechanism are necessary by which an automatic alteration in length of the restoring member 56, 59 or the servo-motor 52—55 is possible. The resilient element in the restoring means may consist of an oil brake 57, 58, 61, a friction drive or an electro-magnetic drive and must be adjustable manually (61a) in operation. The directing force can be produced mechanically by springs 63, 64 hydraulically by a pressure cylinder or electro-magnetically by a solenoid with a core.

With a rigid restoring means (Fig. 12, 30, 31, 34—39, 56, 59, 65) care must therefore be taken that the length of the restoring member 56, 59 of the servo-motor 52 is adjustable by hand 192 in order to bring the servo-motor at the commencement of the winding operation into the correct initial position. The directing force and the resilient element are dispensed with.

The feelers transmit their adjustment to the restoring means. With the resilient restoring means shown in Fig. 1 this transmission is effected through a direction changing gearing which is driven by reversal of the machine which operates at 33. The rigid restoring means does not require such a mechanism.

A hydraulic servo-motor (compare Fig. 1) may consist of a control and a power cylinder. The movable parts of these cylinders are connected in suitable manner with one another through the restoring means. With the resilient restoring means, it is recommended, to provide supply pipes on the power cylinder which connect in any way with the energy storing means and can be switched off and on by hand (the double piston 96 with inlet and exhaust pipes 97, 98, 99). By such means the displacement of the power cylinder piston is rendered possible independently of the feeler position. During the reversing and stoppage of the machine with resilient restoring means, closing members are necessary by which the energy transmitting means actuating the servo-motor is shut off (double piston 101 with supply and exhaust pipes 102—106). The flow of energy driving the servo-motor must be regulatable (valve 43) both with rigid and also with resilient restoring means.

Figure 8:
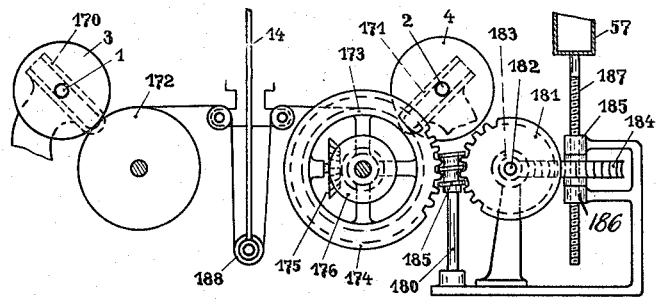
Figure 8 is an elevational view with portions in section of still another driving mechanism.
Figure 9:
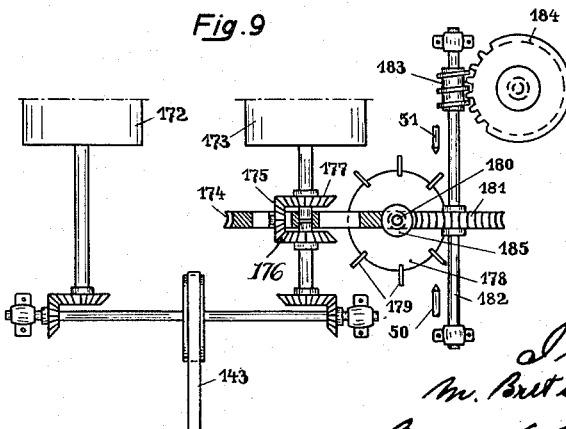
Figure 9 is a plan view of the modification shown in Figure 8.

If the arrangement is such, that in addition to the driving motor, as already mentioned, a separate control motor is provided, in dealing with a hydraulic control motor, the latter may replace the power cylinder 52 of the hydraulic servo-motor. The restoring rod 56 is then adapted to be driven through suitable means, for example a worm and worm wheel, from the rotating shaft of the control motor. The pipes 50 and 51 to be connected to the hydraulic control motor then act according to the position of the control pistons 37, 38 either to effect stoppage or right or left hand running of the motor shaft. If a control motor is used other than a hydraulic motor, then in lieu of the control motor an equivalent means must be used, such as shown in Figs. 8 and 9 and described in the description hereinafter.

With the aid of the piston displacement of the power cylinder effected by the feeler device or by the hand control device, the relative speed of rotation of the tension or winding rollers is influenced through suitable devices. The action of the servo-motor on the devices which influence the speed of rotation of the tension or winding rollers can be effected directly or indirectly. Indirect actuation is provided in the construction shown in Fig. 1.

With direct actuation the servo-motor piston could, for example, act on mechanical brakes coacting with the tension or winding rollers. The nature of the brakes is immaterial.

The braking devices may act on one or both tension or winding rollers. This depends on whether only one of the tension or winding rollers is driven or both. If only one is driven, the braking device acts on that which is not driven, i. e. the unwinding roller. If both are driven the braking device acts in succession on the unwinding and winding rollers. The servo-motor does not act directly on the brakes but regulatable resistances of mechanical, hydraulic, electric or similar kind such as springs, flow resistances, regulatable electric resistances or the like are interposed.

With winding machines unilaterally driven, so-called automatic brakes may be used in which the brake resistances are applied only in one direction of rotation and not in the other. If springs are used as regulatable resistances they should be so arranged that the springs of the unwinding roller are completely tensioned at the beginning of the winding operation. During winding the control device acts on both springs in such manner that the one spring is slightly released and the other tensioned. At the moment at which the release of the one spring begins, the tension of the other must commence. With a change of direction, the same operation is carried out in the reverse succession.

With winding machines driven on both sides in which the two tension or winding rollers are connected with one another by a differential or like gearing, then the driving motor acts on the still freely movable part of the differential. Simple brakes can be used which are rigidly connected with the tension or winding rollers or their differential shafts. The driving arrangement shown in Figs. 1 and 2 and the control of the same by the servo-motor can be replaced by the arrangements illustrated in Figs. 3 to 9. The driving arrangements illustrated in Figs. 2–9 will now be explained.

In Fig. 2, 142 is the driving motor. It can rotate in a suitable direction and dries through the belt 143 the belt pulley 144. By the rotation of this belt pulley the bevel wheels 145 of the differential gearing are driven in known manner. The bevel wheels 146, 147 are thus set in rotation. They rotate the shafts 1a and 2a and through the bevel pinions 148, 149 and 150, 151 rotate the winding rollers 1 and 2. On the shafts 1a and 2a are mounted sets of bevel pinions 152, 153 and 154, 155 which drive the pumps 70, 71 and 75, 76. The resistance opposing these pumps in their operation is controlled by the servo-motor. In consequence the turning moment to be overcome at the bevel pinions 146, 147 differs in amount and therefore there is imparted a different speed through the bevel pinion 145 in the known operation of the differential to the shafts 1a and 2a or 1 and 2.

In the modification of the driving mechanism shown in Figure 3 the winding roller at any time is always driven by a motor and the unwinding roller is controlled by a brake. A servo-motor controls the amount of the braking action.

In Fig. 3 there is provided in lieu of the differential, a clutch which is actuated by the handle 156. According to whether the clutch part 157 or 158 is in mesh, the winding roller 4 or 3 is driven. The direction of rotation is also thus determined. The driving motor consequently requires to have only one direction of rotation. On the shafts 1a and 2a are mounted brake discs 159 and 160. The brake surfaces 161, 162 press against these brake discs. These surfaces are acted on by springs 163, 164 which are compressed by opposing discs 165, 166. The pressure of the opposing discs is produced by corresponding displacement of the rod 190 which can be displaced by the servo-motor 52 to the right or to the left. This servo-motor must then effect with its extended piston rod 56 (Fig. 12) in known manner through gearing the to and fro motion of the rod or it must transmit its motion as is clear from the description of Fig. 12 through the rack bar 195 in conjunction with the pinion 196 to the rack bar 189. With such an arrangement the driving motor need only have one direction of rotation. Also the nature of the braking action must be observed. When the one spring begins to be released the tension of the other spring must come into operation.

In the modification of the driving mechanism shown in Figure 4 the braking action on the unwinding roller is maintained constant and the number of revolutions of the driving motor 142 which drives the winding roller is controlled by the servo-motor.

In Fig. 4 the motor drives the winding rollers 1 and 2 in similar manner to Fig. 3 through a clutch. In this instance it is shown that the brake discs 159, 160 can be mounted directly on the spindles 1 and 2 of the winding rollers 3 and 4. With this arrangement the rollers 3 and 4 are held under a constant braking moment and the servo-motor influences by its free end through known gearing or through the rack bar 189 a resistance 168 interposed in the motor circuit.

In Fig. 5 the arrangements indicated in Figs. 3 and 4 are associated together. The servo-motor influences with its piston through the rack bar 189 both the braking of the brake discs 159 and 160 and also the displacement of the resistance 168.

The driving mechanism shown in Figure 6 illustrates an arrangement in which the control of the braking mechanism for both rollers is effected by the servo-motor. In this instance a motor is provided which has two directions of rotation and the drive is transmitted through a differential which connects the two rollers. It is to be observed that during the first half of a winding operation the braking moment on the unwinding roller is varied and during the second half the braking moment on the winding roller is varied.

In Fig. 6 the drive is taken from the belt 143 to the differential. Fig. 6 shows a similar arrangement to Fig. 2. In lieu of the hydraulic brake, however, a mechanical brake with springs and brakes is provided as in Fig. 3. These are controlled by the servo-motor. In braking it is to be observed that at the commencement of the unwinding operation, one spring is under strong tension and thus produces a braking action, while the other spring is not tensioned at all and produces no braking action. During the winding operation in the first half the tensioned spring is completely released and therewith a reduction in the braking action produced. Only when the release of this spring is complete does the tension of the other spring commence. The motor must have two directions of rotation.

Figure 7:
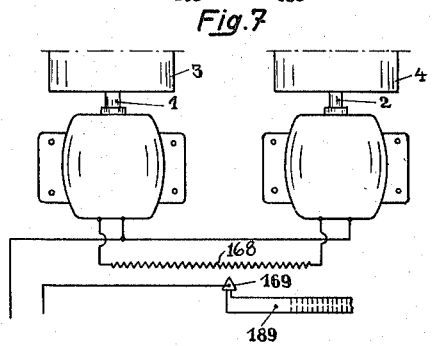
Figure 7 illustrates in plan view still another modification of the driving mechanism.

The driving mechanism illustrated in Figure 7 shows a modification in which a separate driving motor is provided for each of the two rollers. Each of these rollers may have any direction of rotation. The regulation of the motors is secured by the servo-motor by regulating the supply of energy to either one or both of the motors.

Fig. 7 shows an arrangement in which the drive of the winding rollers is effected by two motors. The speed of these motors is influenced by the servo-motor. In this case the servo-motor displaces a regulating device 169 as a result of which the flow of energy to the motors and therewith the number of revolutions is altered. The motors in this case must have two directions of rotation.

The modification illustrated in Figures 8 and 9 shows a device wherein gearing is interposed between the driving shaft and one of the associated rollers whereby an increased or reduced speed of rotation may be imparted to this particular roller.

In Figs. 8 and 9 is shown an arrangement which operates on the so-called rising beam method. The rollers 1 and 2 of the beams 3 and 4 are displaceable in guide tracks 170, 171 so that each can assume different positions in these guide tracks according to the diameter. The material is wound and unwound by the rollers 173, 172. The rollers 173, 172 are driven by a motor which has two directions of rotation just as in the earlier described arrangement in which one motor is used. As clutches are not provided as they are in Figs. 3, 4 and 5 with which the direction of rotation can be varied, the motor must have two directions of rotation. In this method the speed of the two rollers need not be varied by so large an amount as in the other forms of drive. Only the one roller, in this case the roller 173, is given a speed change. The speed is either increased or reduced. For this purpose a differential is interposed.

This differential acts through a worm wheel 174 with bevel pinion 175 and thereby in known manner varies the speed imparted by the bevel pinion 176 through the bevel pinion 175 to the bevel pinion 177. The desired alteration of the number of revolutions of the roller 173 is thereby obtained. The movement of the worm wheel 174 is influenced by the servo-motor. In lieu of the cylinder shown in Fig. 1 into which the pipe connections 50, 51 extend there is in this case a small turbine. The fluid coming from the pressure vessel 41 can then act through the pipes 50 or 51 direct on the blades 179 of the turbine 178. The direction of rotation of the turbine is altered according to whether liquid is supplied from the pipe 50 or 51. On the shaft 180 of the turbine wheel 178 is mounted a worm 185 which meshes with the worm wheel 174 and thus transforms the rotation of the turbine into a slow rotation and thereby influences the number of revolutions of the roller 173. As in the present case the servo-motor shown in Fig. 1 with its pistons 53, 54, 55 and the projecting piston end are dispensed with, another restoring means must be provided. This is shown in Fig. 8. The rotation of the turbine shaft 180 is transmitted by the same worm as rotates the worm wheel 174 to a worm wheel 181. On its shaft 182 is also mounted a worm 183. This meshes with a worm wheel 184. This worm wheel 184 is mounted between the bearings 185 and 186. It is screw-threaded internally and a rod 187 corresponding thereto can be screwed upwardly or downwardly into the same. This rod 187 carries at its upper end a cylinder 57 of the restoring means shown in Fig. 1. By these parts herein described it is possible to transform the high speed of rotation of a turbine into a slow speed and thereby effect a reduced lift or lowering of the cylinder 57. From Fig. 8 it is also clear that the tension can be determined by simple guide rollers 188. The raising and lowering of these guide rollers effects a displacement of the rod 14 shown in Fig. 1, the actuation of which is again transmitted to the remaining adjusting mechanism.

The apparatus described can, in lieu of being used for jigger dyeing machines, be used for altering the speed of other winding machines which wind material such as paper or wires, textile threads or the like and in which the rollers, rolls or the like, to be unwound, alter their speed in relation to that of the unwinding rollers, rolls, spools or the like.

With the use of trough guide rollers as feelers there is provided in jigger dyeing machines a particular advantage in the dyeing art in that by the vertical vibrations which the portion of the material lying between the guide rollers 11 and 12 make within the dye bath a particularly intensive dyeing of the material is attained. The vibrations in this portion of the material also ensure that the dye bath is continuously maintained in motion so that it cannot settle.

I claim:

1. An apparatus for producing a uniform tension in material, particularly the material being treated in jigger dyeing machines comprising means for feeding said material, means responsive to variations of tension in said material, braking means operative on said feeding means to vary the tension of the material fed thereby, a motor controlling the operation of said braking means, means for reversing the action of said feeding means and means operated by said reversing means for reversing the operation of said motor.

2. An apparatus for producing a uniform tension in material, particularly the material being treated in jigger dyeing machines comprising means for feeding said material, means responsive to variations of tension in said material, braking means operative on said feeding means to vary the tension of the material fed thereby, a motor controlling the operation of said braking means, means for reversing the action of said feeding means, an auxiliary motor controlled by said tension responsive means controlling the operation of said motor and means operated by said reversing means for reversing the operation of said auxiliary motor and thereby the operation of said motor in order to reverse the operation of said braking means.

3. An apparatus for producing a uniform tension in material, particularly the material being treated in jigger dyeing machines comprising means for feeding said material, means responsive to variations of tension in said material, braking means operative on said feeding means to vary the tension of the material fed thereby, a motor normally in neutral position controlling the operation of said braking means, means for reversing the action of said feeding means, means operated by said tension responsive means controlling the action of said motor, means operated by said reversing means for reversing the operation of said motor, means preventing any action of said motor during the action of said reversing means and means for returning said motor to neutral position.

4. An apparatus for producing a uniform tension in material, particularly the material being treated in jigger dyeing machines comprising means for feeding said material, means responsive to variations of tension in said material, braking means operative on said feeding means to vary the tension of the material fed thereby, a motor controlling the operation of said braking means, means for reversing the action of said feeding means, an auxiliary motor controlling the operation of said motor and means responsive to said reversing means and said tension responsive means controlling the action of said auxiliary motor and thereby said motor.

5. An apparatus for producing a uniform tension in material, particularly the material being treated in jigger dyeing machines comprising means for feeding said material, means responsive to variations of tension in said material, braking means operative on said feeding means to vary the tension of the material fed thereby, a motor controlling the operation of said braking means, means for reversing the action of said feeding means and means responsive to said reversing means and said tension responsive means controlling the action of said motor whereby both the direction and the amount of action of said braking means is controlled and means returning said motor to a position of equilibrium after each actuation thereof.

6. An apparatus for producing a uniform tension in material, particularly the material being treated in jigger dyeing machines comprising means for feeding said material, means responsive to variations of tension in said material, braking means operative on said feeding means to vary the tension of the material fed thereby, a motor controlling the operation of said braking means, means for reversing the action of said feeding means, an auxiliary motor controlling the operation of said motor and means responsive to said reversing means and said tension responsive means controlling the action of said auxiliary motor and thereby said motor and means returning said auxiliary motor and said motor to positions of equilibrium after actuation thereof.

7. An apparatus for producing uniform tension in material comprising an unwinding roller for said material, a winding roller for said material, means for rotating said rollers, a tension responsive device actuated by said material, a hydraulic brake cooperating with said unwinding roller, a hydraulic brake cooperating with said winding roller, a cylinder having a port therein, a piston in said cylinder controlled by said tension responsive device and cooperating with said port, conduits connecting said cylinder with said hydraulic brakes at opposite sides of said piston, a conduit leading from said port and said port controlling the action of said brakes.

8. An apparatus for producing uniform tension in material comprising an unwinding roller for said material, a winding roller for said material, means for rotating said rollers, means for reversing the direction of rotation of said rollers, a tension responsive device actuated by said material, means controlling the rotation of said rollers, governing means for said controlling means, said governing means being automatically operated intermittently by said tension responsive means always only in the same direction from one end position to the other and means for reversing these directions of displacement on the reversal of the direction of rotation of said rollers so that said governing means might be always operated in one direction.

9. An apparatus for maintaining a uniform tension in material, particularly the material being treated in jigger dyeing machines comprising means for feeding the material, means controlling said feeding means, means responsive to variations of tension in said material, movable means controlling said means controlling said feeding means, control means for said movable means, means connecting said movable means and said control means whereby a movement in one direction of said movable means will cause a movement in the opposite direction of said control means, transmission means connecting said means responsive to variations of tension to said means connecting said movable means and said control means to operate said control means, adjustable means cooperating with said means responsive to variations of tension for securing a desired tension in said material, means for varying the length of said movable means without varying the position of said movable means, and means for modifying the adjustment of said last mentioned means.

10. An apparatus for maintaining a uniform tension in material, particularly the material being treated in jigger dyeing machines comprising means for feeding the material, means controlling said feeding means, means responsive to variations of tension in said material, a movable member controlling said means controlling said feeding means, control means for said movable member, automatic regulating means of varying length on said movable member, means connecting said automatic means and said control means whereby a movement in one direction of said movable member will cause a movement in the opposite direction of said control means, transmission means connecting said means responsive to variations of tension to said means connecting said automatic means and said control means to operate said control means, adjustable means cooperating with said means responsive to variations of tension for securing a desired tension in said material, and means cooperating with said automatic means tending to hold said automatic means in normal position so that upon movements of said movable member said means responsive to variations of tension will always oscillate about the same position of equilibrium so that said material will be held at substantially constant tension.

11. An apparatus for maintaining a uniform tension in material, particularly the material being treated in jigger dyeing machines comprising means for feeding the material, means controlling said feeding means, means responsive to variations of tension in said material, a movable member controlling said means controlling said feeding means, control means for said movable member, means connecting said movable member and said control means whereby a movement in one direction of said movable member will cause a movement in the opposite direction of said control means, transmission means connecting said means responsive to variations of tension to said means connecting said movable member and said control means to operate said control means, adjustable means cooperating with said means responsive to variations of tension for securing a desired tension in said material, means for reversing said feeding means, and means actuated by said reversing means for reversing the action of said control means and thereby the movement of said movable member.

12. An apparatus for maintaining a uniform tension in material, particularly the material being treated in jigger dyeing machines comprising means for feeding the material, means controlling said feeding means, means responsive to variations of tension in said material, a movable member controlling said means controlling said feeding means, control means for said movable member, automatic regulating means of varying length on said movable member, means connecting said automatic means and said control means whereby a movement in one direction of said movable member will cause a movement in the opposite direction of said control means, transmission means connecting said means responsive to variations of tension to said means connecting said automatic means and said control means to operate said control means, adjustable means cooperating with said means responsive to variations of tension for securing a desired tension in said material, means cooperating with said automatic means tending to hold said automatic means in normal position so that upon movements of said movable member said means responsive to variations of tension will always oscillate about the same position of equilibrium so that said material will be held at substantially constant tension, means for reversing said feeding means and means actuated by said reversing means for reversing the action of said control means and thereby the movement of said movable member.

13. An apparatus for maintaining a uniform tension in material, particularly the material being treated in jigger dyeing machines comprising means for feeding the material, means responsive to variations of tension in said material, braking means acting on said feeding means for varying the tension in said material, a control element for said braking means, a hydraulically movable member controlling said control element, means operated by said means responsive to variations of tension controlling said movable member, and means connecting said movable member and said movable member controlling means whereby a movement in one direction of said movable member will cause a movement in an opposite direction of said movable member controlling means.

14. An apparatus for maintaining a uniform tension in material, particularly the material being treated in jigger dyeing machines comprising means for feeding the material, means controlling said feeding means, means responsive to variations of tension in said material, movable means controlling said means controlling said feeding means, control means for said movable means, means connecting said movable means and said control means whereby a movement in one direction of said movable means will cause a movement in the opposite direction of said control means, transmission means connecting said means responsive to variations of tension to said means connecting said movable means and said control means to operate said control means, adjustable means cooperating with said means responsive to variations of tension for securing a desired tension in said material, means for varying the length of said movable means without varying the position of said movable means, means for modifying the adjustment of said last mentioned means, said means controlling said feeding means including an electric motor and a circuit therefor, and means controlling the flow of current to said motor controlled by said movable member.

15. An apparatus for maintaining a uniform tension in material, particularly the material being treated in jigger dyeing machines comprising means for feeding the material, means controlling said feeding means, means responsive to variations of tension in said material, movable means controlling said means controlling said feeding means, control means for said movable means, means connecting said movable means and said control means whereby a movement in one direction of said movable means will cause a movement in the opposite direction of said control means, transmission means connecting said means responsive to variations of tension to said means connecting said movable means and said control means to operate said control means, adjustable means cooperating with said means responsive to variations of tension for securing a desired tension in said material, means for varying the length of said movable means without varying the position of said movable means and means for modifying the adjustment of said last mentioned means, said means controlling said feeding means including a differential drive, and means controlled by said movable means operating said differential drive to control said feeding means.

16. An apparatus for maintaining a uniform tension in material, particularly the material being treated in jigger dyeing machines comprising means for feeding the material, means responsive to variations of tension in said material, braking means acting on said feeding means for varying the tension in said material, a cylinder, a control element for said braking means in said cylinder, a hydraulically movable member also in said cylinder controlling said control element, means operated by said means responsive to variations of tension controlling said movable member, winding and unwinding rolls for said material, and said cylinder having a port cooperating with said control element and communicating with said braking means so that according to the movement of said movable member the unwinding roll at the beginning of the unwinding is opposed by a strong braking action which is gradually reduced during the first half of the unwinding and then becomes practically constant while the winding roll reversely is subjected to very slight breaking action during the first half of the winding which then increases gradually during the second half.

17. An apparatus for maintaining a uniform tension in material, particularly the material being treated in jigger dyeing machines comprising means for feeding the material, means responsive to variations of tension in said material, braking means acting on said feeding means for varying the tension in said material, a control element for said braking means, a hydraulically movable member controlling said control element, means operated by said means responsive to variations of tension controlling said movable member, means for reversing said feeding means, and means actuated by said reversing means for reversing the action of said means controlling said movable member.

18. An apparatus for maintaining a uniform tension in material, particularly the material being treated in jigger dyeing machines comprising means for feeding the material, means responsive to variations of tension in said material, braking means acting on said feeding means for varying the tension in said material, a control element for said braking means, a hydraulically movable member controlling said control element, means operated by said means responsive to variations of tension controlling said movable member, means for reversing said feeding means, means actuated by said reversing means for reversing the action of said means controlling said movable member, and means for preventing action of said movable member during the operation of said means for reversing the action of said means controlling said movable member.

19. An apparatus for maintaining a uniform tension in material, particularly the material being treated in jigger dyeing machines comprising means for feeding the material, means responsive to variations of tension in said material, braking means acting on said feeding means for varying the tension in said material, a control element for said braking means, a hydraulically movable member controlling said control element, means operated by said means responsive to variations of tension controlling said movable member, means connecting said movable member and said movable member controlling means whereby a movement in one direction of said movable member will cause a movement in an opposite direction of said movable member controlling means, and means for varying the operative speed of said movable member.

20. An apparatus for maintaining a uniform tension in material, particularly the material being treated in jigger dyeing machines comprising a winding roll and an unwinding roll for the material, means responsive to variations of tension in said material, a stationary cylinder, a piston in said cylinder, means controlled by said piston controlling said winding and unwinding rolls to regulate the tension of the material being treated, a second stationary cylinder, a piston in said second cylinder controlled by said means responsive to variations of tension, conduits interconnecting said cylinders, and means operated by said piston in said first mentioned cylinder transmitting the movements thereof to said piston in said second cylinder in a reverse direction to that of the movement of said piston in said first mentioned cylinder.

21. An apparatus for maintaining a uniform tension in material, particularly the material being treated in jigger dyeing machines comprising means for feeding the material, means controlling said feeding means, means responsive to variations of tension in said material, movable means controlling said means controlling said feeding means, control means for said movable means, means connecting said movable means and said control means whereby a movement in one direction of said movable means will cause a movement in the opposite direction of said control means, transmission means connecting said means responsive to variations of tension to said means connecting said movable means and said control means to operate said control means, adjustable means cooperating with said means responsive to variations of tension for securing a desired tension in said material, means for varying the length of said movable means without varying the position of said movable means, and means for guiding said material including a support which is adjustable in height.

MAX BRETSCHNEIDER.